Jan. 9, 1968      K. BÜSING      3,363,084
APPARATUS AND METHOD FOR PRODUCING A
BEAD-FREE WELD OF A METAL STUD
Filed April 20, 1964
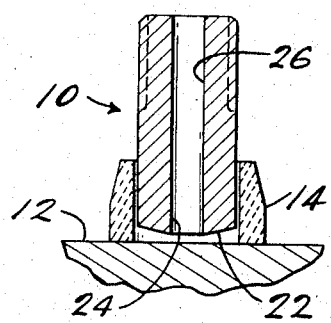
FIG-1-
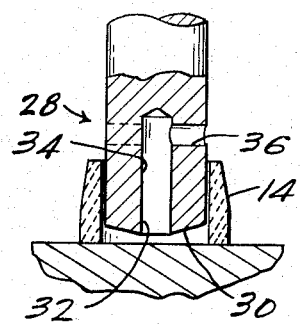
FIG-2-
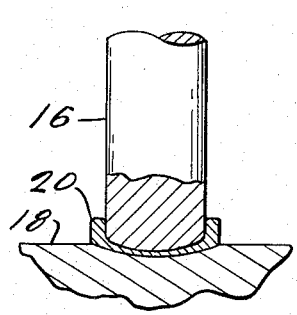
FIG-3-
PRIOR ART
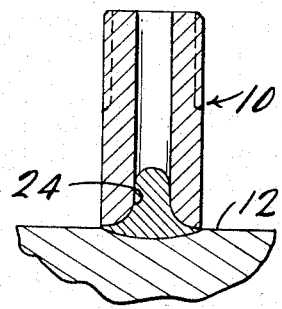
FIG-4-
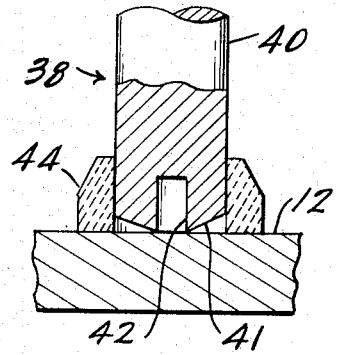
FIG-5-
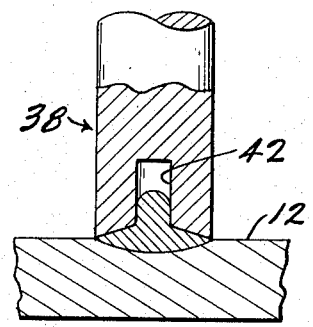
FIG-6-
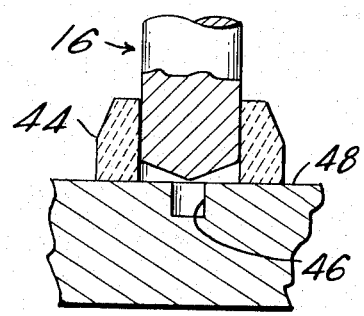
FIG-7-
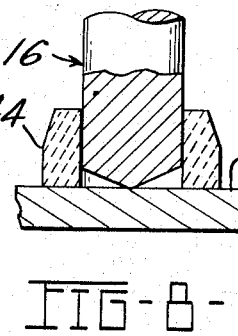
FIG-8-
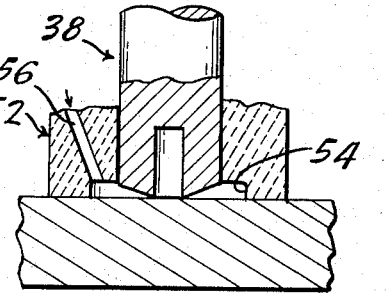
FIG-9-
INVENTOR:
KONRAD BÜSING.
BY Owen & Owen
ATT'YS.

United States Patent Office 3,363,084
Patented Jan. 9, 1968

3,363,084
APPARATUS AND METHOD FOR PRODUCING A BEAD-FREE WELD OF A METAL STUD
Konrad Büsing, Peine, Germany, assignor, by mesne assignments, to Crompton Parkinson Limited, London, England, a British firm
Filed Apr. 20, 1964, Ser. No. 361,177
Claims priority, application Germany, Apr. 23, 1963, P 31,652
8 Claims. (Cl. 219—99)

ABSTRACT OF THE DISCLOSURE

A method and apparatus are provided by means of which, when a metal stud having a recess centrally thereof is welded to a workpiece by an arc welding technique, the molten metal formed at the end of the stud is forced centrally inwardly to leave a bead-free weld.

---

This invention relates to a stud of metal or metal alloy weldable to a metal object and to a method and means for welding the stud to a metal object by electric arc welding with the weld point of the stud surrounded by an enclosed wall.

Upon the welding of studs in the form of pins, hooks, threaded bolts and the like to workpieces with the aid of one of the ordinary arc welding methods, there is formed between the parts to be welded an arc which effects a welding both on the stud and on the workpiece or metal object. Upon immersion of the stud into the welding bath, the molten material is forced outwardly and, in spite of a ceramic ring which surrounds the end to be welded, deposits itself in the shape of a more or less uniform bead around the stud. This welding bead is very disturbing in many applications. Consequently, there already have been attempts made to retain the welding bead within the outer diameter of the stud. The stud was accordingly offset in the area of the weld point, the inner diameter of the ceramic ring or ferrule being about equal to the inner diameter of the stud. In this manner, the outer diameter of the welding bead was restricted substantially to the diameter of the stud. However, the change in cross section of the stud, with the indentation, appreciably diminished the strength of the stud directly over the weld point. Consequently, it has not been possible to make a satisfactory stud without a projecting bead.

It has been possible already to weld studs on a workpiece without formation of a disturbing weld bead. However, this has been accomplished only with electric-arc, condenser-discharge welding which has been adapted solely for studs with a diameter of up to 6.5 mm.

In order to weld a stud to a metal object without a disturbing bead formation, by means of an electric arc welding method, the welding end of the stud can be provided with an inner recess for the molten welding material. In one embodiment, the recess is in communication with the outer atmosphere so that the molten metal during the welding can be forced into the recess by excess pressure produced around the welding end of the stud during the welding operation. The welding pressure is established by the electric arc and expansion of the gases around the stud end and the workpiece. In this manner, any welding bead is kept away from the outer surface of the stud and the outer surface, therefore, is available to be used as a guide surface to the workpiece.

The effectiveness of the welding pressure can be increased by using an enclosing wall or ferrule around the welding end of the stud to form an enclosed welding chamber.

While satisfactory results are obtained with such a stud, the production of a relatively long bore in free communication with the outer atmosphere is time consuming and increases the cost of the stud considerably. Also, the strength of the stud can be decreased somewhat especially when the bore extends through a threaded area of a threaded stud.

Therefore, in another embodiment, a stud to be used for carrying out the invention can be provided with a central recess, preferably in the shape of a blind hole in the welding end. At the same time, a wall or ferrule is used to enclose the weld point and fits closely on the stud end to be welded and lays close to the surface of the workpiece. In this way, an enclosed welding chamber is attained in which higher pressure necessary for the conveyance of the melten metal into the blind recess may be developed. The pressure prevents the molten welding material from moving outwardly and forming a disturbing welding bead.

For the purpose of increasing the conveying effect, according to a further feature of the invention, a gaseous medium under excess pressure can be introduced into the enclosed chamber of the welding area. Preferably for this purpose, a gaseous medium which reacts only slightly with the molten metal is utilized.

Further features and objects of the invention will become apparent from the claims in connection with the following description of the embodiments of the invention shown by way of illustration in the drawing:

FIG. 1 shows a vertical section of a stud according to the invention, when in welding position;

FIG. 2 is a view similar to FIG. 1 of a slightly modified stud according to the invention;

FIG. 3 is a view in vertical cross section of a conventional stud which is completely welded;

FIG. 4 is a view in vertical cross section of a stud similar to the stud of FIG. 1 after being welded;

FIG. 5 is a view in vertical section of a modified stud embodying the invention, and in welding position;

FIG. 6 is a view in section of the stud of FIG. 5 when completely welded;

FIG. 7 is a view in vertical cross section similar to FIG. 1 but of another embodiment of the invention;

FIG. 8 is a view in vertical cross section of a further embodiment; and

FIG. 9 is a vertical sectional view of still another modification of the invention.

Referring more particularly to FIG. 1, a stud 10 is made of metal or a metal alloy which, by means of an ordinary electric arc welding method, is to be welded without a bead to a metal workpiece 12. Preferably, an auxiliary ceramic ring or ferrule 14 is also used. The stud 10 can be pin shaped, hook shaped, or the like, and can also be provided with a thread.

In a typical electric arc welding method used to weld the stud to the workpiece, the stud end is brought into contact with the surface of the workpiece and the stud is withdrawn a predetermined distance from the surface. After a predetermined time, during which an electric arc is established between the stud and the surface, and after formation of molten metal on both the end of the stud and the surface of the workpiece, the stud again is moved toward the workpiece and the stud end to be welded is immersed in a welding bath. This electric arc welding method is known and, therefore, requires no further explanation.

To prevent a welding bead as shown in FIG. 3 in which a conventional stud 16 is welded to a workpiece 18 with a bead 20 formed in the usual manner, the stud 10 in accordance with the invention has a welding end 22 in which is formed an inner recess 24 which is in free communication with the atmosphere.

In the embodiment of FIG. 1, the recess 24 can communicate with the atmosphere through a straight, longitudinal bore 26. In a slightly modified stud 28 shown in FIG. 2, a welding end 30 of the stud has a recess 32 and a blind hole or bore 34 which communicates with the atmosphere through a transverse bore 36. The transverse bore 36 may extend completely through the stud 28 but must, in any event, be formed above the ceramic ring or ferrule 14, if it is used.

As apparent from FIG. 4, through the stud formed according to the invention, the disturbing weld bead 20 of FIG. 3 is avoided because the weld metal is forced into the recess 24 communicating with the atmosphere, with the pressure formed during welding forcing the weld metal in this direction.

Referring more particularly to FIG. 5, a modified stud 38 to be welded to the workpiece or object 12 can be of various shapes similar to the stud 10 and can also be provided with a thread 40, if desired.

For the prevention of a welding bead on the outside of the stud at a point where the stud is welded to the metal object, the stud 38, in this instance, has a welding end 41 with a central recess 42 which in this instance is formed by a blind hole. To enclose the welding area, in this instance, a ferrule or wall 44 is used. The wall 44 adjoins the periphery of the stud end 41 and lies close to the surface of the workpiece 12. Aside from clearances occurring through finishing tolerances the welding chamber between the stud end 41 and the metal workpiece 12 is enclosed during the welding operation so that the chamber is maintained under relatively high pressure during welding.

Because of the excess pressure developed by the arc and expansion of gases in the welding chamber between the stud and the workpiece, part of the fluid metal of the welding bath is forced into the recess 42 as shown in FIG. 6, with the recess being partially filled. An undesirable weld bead cannot thereby be formed on the periphery of the stud as this superfluous molten metal is thrust into the recess 42 by the pressure differential, as shown in FIG. 6.

Instead of forming the recess 42 in the stud end 41, a recess 46 can be disposed on the welding surface of a modified workpiece 48 (FIG. 7) for carrying out the welding operation. In this instance, the ordinary stud 16 can be used.

With a thin walled workpiece or metal object 50 of FIG. 8, which may be a metal sheet of a few millimeters thickness, for example, the application of a recess in the stud end or in the metal object or workpiece can be omitted. It has been found that the excess pressure prevailing in the welding chamber, after a welding of the metal object, will press a portion of the molten welding material through the metal sheet. The portion of the molten material to be displaced can be discharged to the opposite side of the metal workpiece, opposite the welding point. The area of the metal object to be welded subsequently closes again so that after completion of the welding operation, the discharge point of the molten welding material on the side opposite the weld point is hardly any longer visible.

In order to increase the excess pressure necessary for conveyance of the molten welding material to the recess, a wall 52 or ferrule in FIG. 9 can be employed. The wall 52 includes an annular groove 54 to which are connected one or several passages 56. The passages 56 are in communication with a suitable source of a gaseous medium under excess pressure. Preferably, the medium is one which reacts little, if any, with the molten material formed during the weld. With the wall 52 constructed in this manner, it preferably is affixed to the welding tool or other means used to carry out the arc welding method. The wall 52 preferably is made of insulating, heat-resistant material which is not readily subject to attack by the molten welding material or gases.

I claim:

1. In a method for welding a metal stud to a metal workpiece by means of electric welding which includes striking an arc between the stud and the workpiece and retracting the stud from the workpiece of a predetermined distance, and subsequently plunging the stud against the workpiece after forming molten metal on the end of the stud and on the workpiece, the improvement comprising establishing a zone of low pressure centrally of the stud and establishing a high pressure zone around the stud of sufficient magnitude to force excess weld metal inwardly centrally of the stud to the low pressure zone when the stud is plunged against the workpiece, whereby a substantially bead-free weld is made.

2. The method according to claim 1 characterized by the zone of excess pressure being produced by an electric arc.

3. The method according to claim 1 characterized by the high pressure zone being produced by maintaining a ferrule around the end of the stud plunged against the workpiece, which ferrule fits closely with the outer surface of the stud throughout the height of the ferrule.

4. Means for welding a stud to a workpiece by an arc welding technique to form a substantially bead-free weld, said means comprising, in combination an elongate metal stud having a welding end, means forming a recess centrally of said stud near the welding end, wall means fitting closely with said stud over the height of the wall means and extending straight downwardly to the workpiece surface to establish a high pressure zone around the welding end of the stud during a welding operation, the dimensions of the high pressure zone not substantially exceeding the corresponding dimensions of the metal stud, whereby excess molten metal is forced inwardly to said recess.

5. Means according to claim 4 wherein said recess is formed as a hole in the workpiece.

6. Means according to claim 4 characterized by the recess being formed by a blind hole in the stud.

7. Means according to claim 4 characterized by said wall means having at least one channel through which gas under pressure can be supplied to the high pressure zone.

8. Means according to claim 7 wherein said wall means is made of highly heat-resistant material not readily attackable by the molten material and fixedly connected wtih a welding tool.

References Cited

UNITED STATES PATENTS

| | | | |
|---|---|---|---|
| 1,606,894 | 11/1926 | Phelps | 219—107 |
| 2,055,342 | 9/1936 | Schneider | 219—107 |
| 2,416,204 | 2/1947 | Nelson | 219—99 |
| 2,467,391 | 4/1949 | Kerr et al. | 219—107 |
| 2,491,479 | 12/1949 | Dash | 219—98 |
| 2,510,101 | 6/1950 | Graham | 219—95 |
| 2,604,569 | 9/1952 | Denneen | 219—105 |
| 2,635,167 | 4/1953 | Nelson | 219—99 |
| 3,010,011 | 11/1961 | Darlington | 219—105 |
| 3,145,288 | 8/1964 | Woodling | 219—99 |
| 3,253,115 | 5/1966 | Logan | 219—99 |

RICHARD M. WOOD, *Primary Examiner.*

W. BROOKS, *Assistant Examiner.*